United States Patent [19]

Christman et al.

[11] 3,907,668

[45] Sept. 23, 1975

[54] HYDRODESULFURIZATION OF PETROLEUM DISTILLATES

[75] Inventors: Robert D. Christman; Geoffrey R. Wilson, both of Pittsburgh, Pa.

[73] Assignee: Gulf Research & Development Company, Pittsburgh, Pa.

[22] Filed: Mar. 25, 1974

[21] Appl. No.: 454,333

Related U.S. Application Data

[62] Division of Ser. No. 272,018, July 14, 1972, abandoned.

[52] U.S. Cl. .............................................. 208/216
[51] Int. Cl.² ......................................... C10G 23/02
[58] Field of Search .................................... 208/216

[56] References Cited
UNITED STATES PATENTS

| | | | |
|---|---|---|---|
| 3,340,180 | 9/1967 | Beuther et al. | 208/216 |
| 3,383,301 | 5/1968 | Beuther et al. | 208/216 |
| 3,594,312 | 7/1971 | Christman et al. | 208/216 |
| 3,714,032 | 1/1973 | Bertolacini et al. | 208/216 |
| 3,814,682 | 6/1974 | Christman et al. | 208/216 |
| 3,814,683 | 6/1974 | Christman et al. | 208/216 |
| 3,814,684 | 6/1974 | Christman et al. | 208/216 |

*Primary Examiner*—Delbert E. Gantz
*Assistant Examiner*—G. J. Crasanakis

[57] ABSTRACT

Sulfur-containing petroleum distillates are desulfurized with hydrogen and with a catalyst composite containing a Group VI-B hydrogenating component, at least one iron group hydrogenating component and alumina. The catalyst is prepared by calcining alumina having a bayerite content of 0–50 wt. percent, at a temperature of 800°–1600°F, impregnating the calcined alumina with the hydrogenating components and calcining the impregnated alumina at 800°–1600°F. The composite catalyst is characterized as having a pore volume of at least 0.5cc/g, a surface area of at least 150 m²/g and an average pore radius of 45 to 75 Angstrom units. At least 65 percent of the pore volume of the composite catalyst is in pores having a radius in the range of 50 – 300 Angstrom units.

4 Claims, No Drawings

HYDRODESULFURIZATION OF PETROLEUM DISTILLATES

This is a division, of application Ser. No. 272,018, filed July 14, 1972.

BACKGROUND OF THE INVENTION

The hydrodesulfurization of petroleum hydrocarbons is well-known in the art. It is also known to use catalyst compositions in such hydrodesulfurization processes comprising a supported hydrogenating component which is at least one member of the group consisting of Group VI-B and Group VIII metals in a form capable of promoting hydrogenation reactions. Especially effective catalysts for the purpose of such hydrodesulfurization reactions are those comprising molybdenum and two members of the iron group metals. Preferred catalysts of this class are those containing nickel, cobalt and molybdenum but other combinations of iron group metals and molybdenum such as iron-molybdenum-cobalt, nickel-molybdenum-iron, as well as combinations of nickel and molybdenum, cobalt and molybdenum, nickel and tungsten or other Group VI-B or Group VIII metals taken singly or in combination. The hydrogenating or desulfurizing components of said catalysts can be employed in sulfided or unsulfided form with the sulfided form being preferred.

Although the hydrogenating components indicated above may be employed in any proportions with each other, especially effective catalysts are those in which the hydrogenating components are those in the group consisting of oxides and sulfides comprising (a) a combination of 2 to 25 percent, preferably 4 – 16 percent by weight molybdenum and at least two iron group metals where the iron group metals are present in such proportions that the atomic ratio of each iron group metal in respect to molybdenum is less than about 0.4 and (b) a combination of about 5 to 40 percent, preferably 10 to 25 percent of nickel and tungsten where the atomic ratio of tungsten to nickel is about 1:0.1 to 5, preferably 1:0.3 to 4.

The hydrogenating components are composited with a porous alumina support. The alumina support is normally shaped in the form of granules, pellets or balls, prior to impregnation. The catalyst composite, however, can be in the form of a powder such as is employed for fluid type operations.

Conventionally, in the preparation of the prior art catalyst composites, the hydrogenation components such as molybdenum is deposited on the support from an aqueous solution of salts such as ammonium molybdate, ammonium paramolybdate, molybdenum pentachloride or molybdenum oxalate. After filtering and drying the impregnant is calcined to convert it into the oxide. The carrier is then treated with an aqueous solution of the iron group metal salt followed by calcining. If a second iron group metal is employed, the second iron group metal can be deposited in like manner. Nitrates or acetates of the iron group metals are normally utilized although any water soluble salt which leaves no harmful residue can be employed.

If desired, the iron group metals and molybdenum can be deposited simultaneously, but are preferably deposited in sequence with intervening calcining. Simultaneous impregnation of the iron group metals has been found to be satisfactory.

Calcining of the catalyst composite has been conducted by heating in air to a temperature of 800° to 1600° F. When a sulfided catalyst is desired, the catalyst prepared as described above may be treated in a known manner with hydrogen sulfide or preferably hydrogen-hydrogen sulfide. Typically, the catalyst composition can be presulfided, after calcination, or calcination and reduction, prior to contact with the charge stock, by contacting with a sulfided mixture of hydrogen and hydrogen sulfide. Normally, the sulfiding is conducted at a temperature in the range of 500° to 650° F., at atmospheric or elevated pressures. Presulfiding can be conveniently effected at the beginning of an onstream period at the same conditions to be employed at the start of the desulfurization period. The exact proportions of hydrogen and hydrogen sulfide are not critical and mixtures containing low or high portions of hydrogen sulfide can be used. Relatively low proportions are preferred for economic reasons. Elemental sulfur or sulfur compounds, such as mercaptans, can be used in lieu of hydrogen sulfide.

Although the desulfurization processes of the prior art employing the above-identified catalyst compositions have been useful in the substantial desulfurization of petroleum distillates, higher anti-pollution standards now require an improved distillate catalytic desulfurization process which will continuously remove at least 80 percent of the sulfur from a feed containing up to at least 6 weight precent sulfur. Additionally, it is desirable to employ lower desulfurization temperatures, thereby reducing heating costs and increasing catalyst life.

Accordingly, an object of this invention is to provide an improved petroleum distillate desulfurization process.

Another object of this invention is to provide a novel catalyst for the desulfurization of petroleum distillates.

Yet another object of the invention is to provide a process for the preparation of an improved desulfurization catalyst.

Other objects, advantages and features of the invention will be readily apparent to those skilled in the art from the following description and appended claims.

SUMMARY OF THE INVENTION

An improved distillate catalytic desulfurization process is obtained by employing a catalyst composition comprising a hydrogenating component deposited on a calcined alumina support and wherein at least 40 percent of the volume of pores of the catalyst composite will be in pores having a radius in the range of 50 to 300 A units, the average pore radius of the catalyst composite being in the range of 40 to 80 A units, the surface area of the catalyst composite being at least 150 square meters per gram, and the pore volume of the catalyst composite being at lease 0.4 cubic centimeter per gram.

DESCRIPTION OF THE INVENTION

The invention is applicable to the desulfurization of petroleum distillates. As employed in the description of this invention, the term "petroleum distillates" refers to those crude oil fractions having an initial boiling point above 300° F. at atmospheric pressure and containing less than 1.0 weight percent asphaltenes. Petroleum distillates obtained from crude oils by conventional fractionation, extraction and/or catalytic and thermal processes normally will contain in excess of 0.7 weight percent sulfur. Sulfur concentrations as high as 6.0 weight percent are conventional. To meet the higher antipollution standards required of the industry and to satisfy the requirements of processes employing the distillate products of this invention as feed materials, it has become necessary to obtain an improved distillate desulfurization process.

Improvement in desulfurization processes can be measured by employing a variety of standards. One standard of improvement would be to provide a desulfurization process capable of operating at the same desulfurization activity of the prior art processes but at a substantially reduced temperature. Employing this standard the novel desulfurization catalyst of this invention permits the desulfurization process to be operated at temperatures from 15° to 20° F. below those temperatures employed by the prior art processes to obtain the same desulfurization activity. It will be appreciated by those skilled in the art that operation at a low desulfurization temperature increases the effective life of the desulfurization catalyst.

A second standard for judging the effectiveness of a desulfurization process is to compare the feed rate of the new desulfurization process with the feed rate of the prior art processes to maintain the same level of desulfurization activity. Using this second standard, the novel desulfurization catalyst of this invention permits feed rates from 20 to 30 percent higher than the feed rates which could be employed by the prior art processes in obtaining the same desulfurization activity.

A third, but less satisfactory standard for comparing desulfurization activity of the novel catalyst composition of this invention with the desulfurization catalyst of the prior art, is to compare the desulfurization activities of the new and prior art catalysts when employing identical desulfurization catalyst parameters of temperature, pressure, feed, space velocity, and hydrogen rate. Using this third standard, the novel catalyst compositions of this invention increase the quantity of sulfur removed from the distillates by at least 7 weight percent, which is a substantial increase.

Improved desulfurization catalysts of this invention are obtained by employing Group VI-B and Group VIII metals on a calcined alumina support so as to obtain a catalyst composite having a relatively large average pore radius, in the range of 40 to 80 A units, and wherein at least 40 percent of the pore volume is contained in pores having a radius in the range of 50 to 300 A units. The pore volume of the catalyst composite should be at least 0.40 cc per gram and the surface area of the catalyst composite should be at least 150 square meters per gram. The pore radius as employed in this application is determined by multiplying the pore volume by $2 \times 10^4$ and dividing the result by the surface area. The pore volume distribution is determined by nitrogen adsorption using the method described by E. V. Ballou, O. K. Dollen, in Analytical Chemistry, Volume 32, page 532, 1960.

To obtain the novel catalyst compositions of this invention an alumina support containing less than 2.0 weight percent impurities such as silica and having a bayerite content from 0 to 50 weight percent is employed. Although not to be limited thereto, desirably the minimum particle diameter of the alumina support material employed in forming the catalyst composites of this invention falls within the range of 1/20 to 1/40 inch. The pore volume of the alumina support employed in preparing the catalyst composition should be at least 0.25 cc per gram and the average pore radius should be at least 32 A units. The pore size distribution of the alumina support should be such that at least 25 percent of the pore volume is contained in pores having a radius in the range of 50 to 300 A units.

The alumina support material is dried to remove any free water therefrom. Typically, the alumina support can be dried at a temperature of 250° F. for a time ranging from 4 to 24 hours. Thereafter, the alumina support is calcined at a temperature in the range from 800° to 1600° F. in an oxygen containing atmosphere, such as air, for a period ranging from 1 to 24 hours, prior to impregnation of the alumina with the hydrogenation metal.

The preparation of the catalyst composite as hereafter described will be specifically directed to the preparation of nickel-cobalt-molybdenum-on-alumina catalyst composite, although it will be understood by those skilled in the art that the method of impregnation described herein can also be adapted to other hydrogenation metals.

Extruded alumina pellets pretreated by the above procedure can be admixed with ammonium paramolybdate impregnated with an ammonium monomolybdate solution so as to obtain a catalyst composite containing from 5.0 to 15.0 weight percent of molybdenum, for example. The wet impregnated alumina is preferably then dried at, for example, a temperature of 250° F. for 24 hours.

The alumina support impregnated with the molybdenum is thereafter contacted with an aqueous solution of nickel nitrate and cobalt nitrate. Sufficient nickel nitrate and cobalt nitrate is admixed with the alumina support so as to provide a catalyst composite containing from 0.1 to 5 weight percent nickel and from 0.1 to 5 weight percent cobalt. The wet catalyst composite is dried in a second drying stage at a temperature of, for example, 250° F. for 24 hours. Following the drying stage, the catalyst composite is calcined at a temperature in the range of 800° to 1600° F. for a period of from 1 to 24 hours.

Although a two-step impregnation catalyst preparation procedure has been described it is in the scope of this invention to employ a single impregnation step in adding the hydrogenation metals to the alumina support. As previously noted, when the use of the catalyst in sulfided form is desired, the catalyst can be presulfided after calcination, or after calcination and reduction.

The catalyst composite as prepared will have an average pore radius in the range of 40 to 80 A units, preferably from 45 to 75 A units. The radius of the pores comprising at least 40 percent, preferably at least 65 percent, of the total pore volume will range from 50 to 300 A units. The pore volume of the catalyst composite will be at least 0.40 cc per gram, preferably at least 0.50 cc per gram. The surface area of the catalyst composite will be at least 150 square meters per gram.

The hydrodesulfurization reactions effected pursuant to the process of the invention are conducted at a temperature that is maintained, after the relatively rapid elevation of temperature after startup, in the range of about 550° to 800° F.

The desulfurization reactions are effected by contacting the catalyst with the distillate feed in the presence of uncombined hydrogen partial pressures in the range of about 200 to 4,000 psig. The hydrogen gas employed during the hydrodesulfurization is circulated through the reactor at a rate between about 700 and 3000 standard cubic feet (scf) per barrel of feed. The hydrogen purity may vary from about 60 to 100 percent. If the hydrogen is recycled, it may be necessary to provide for bleeding off a portion of the recycle gas and to make up hydrogen in order to maintain the hydrogen purity within the range specified. If desired, the recycled gas can be washed with a chemical absorbent for hydrogen sulfide or otherwise treated in a conventional manner to reduce the hydrogen sulfide content thereof prior to recycling.

The hydrodesulfurization reaction can be conducted in the liquid or vapor phase and at a liquid hourly space velocity in the range of 0.25 to 10.

Reaction zone pressures in the range of 200 to 5000 psig, normally in the range of 500 to 2000 psig, are maintained in the desulfurization zone. In a continuous hydrodesulfurization process, the novel catalyst compositions of this invention can be employed to remove at least 80 percent of the sulfur concentration of distillate feeds when employing the above described process parameters with sulfur concentrations from 1 to 6 weight percent in the distillate feed.

The following examples are presented to demonstrate the objects and advantages of the invention. It is not intended, however, to limit the invention to the specific embodiments presented therein.

EXAMPLE 1

In this example the criticality of calcining the alumina support at a temperature in the range of 800° to 1600° F. before impregnation of the hydrogenation metal is demonstrated. Alumina having a bayerite concentration of about 15 weight percent and having the following properties was employed in the preparation of the desulfurization catalyst composite:

| Surface Area, square meters/g | | 274.8 |
|---|---|---|
| Pore Volume, g/cc | | 0.62 |
| Average Pore Radius, A units | | 36.4 |
| Pore Volume Distribution | | |
| % of Pore Vol. in Pores of | | |
| 250–300 | A radius | 0.8 |
| 200–250 | | 2.0 |
| 150–200 | | 5.5 |
| 100–150 | | 23.3 |
| 90–100 | | 6.8 |
| 80–90 | | 8.3 |
| 70–80 | | 8.2 |
| 60–70 | | 7.9 |
| 50–60 | | 7.1 |
| 45–50 | | 3.8 |
| 40–45 | | 3.5 |
| 35–40 | | 3.7 |
| 30–35 | | 3.1 |
| 25–30 | | 3.8 |
| 20–25 | | 4.2 |
| 15–20 | | 5.7 |
| 10–15 | | 2.3 |
| 7–10 | | 0.0 |

The alumina support was heated in air at a temperature of 250° F. for a period of 24 hours.

The dried alumina was contacted with an ammonium monomolybdate solution by adding the solution to a vessel containing extruded alumina pellets. The wet material was then dried at about 250° F. for 24 hours. Thereafter, the alumina impregnated with molybdenum was contacted with a nickel nitrate - cobalt nitrate solution in a vessel. The wet material was then dried at about 250° for 24 hours and calcined by heating in air in an electric muffle furnace to 1,000° F. in 6 hours and holding at this temperature for about 10 hours. The concentrations of the ammonium molybdate, nickel nitrate and cobalt nitrate in the solutions were such that the final catalyst composite contained 11.0 weight percent molybdenum, 1.25 weight percent cobalt and 3.2 weight percent nickel.

The finished catalyst composite had a pore volume of 0.508 cc/g, a surface area of 215.9 sq. meters/g, an average pore radius of 47.1 A units, and a pore volume distribution, over the range of pores having a radius of 0 to 300 A units, as follows:

| Pore Radius, A Units | | Pore Volume % |
|---|---|---|
| 250–300 | A Radius | 1.0 |
| 200–250 | | 1.9 |
| 150–200 | | 3.3 |
| 100–150 | | 25.6 |
| 90–100 | | 7.2 |
| 80–90 | | 8.8 |
| 70–80 | | 8.5 |
| 60–70 | | 8.2 |
| 50–60 | | 7.1 |
| 45–50 | | 4.1 |
| 40–45 | | 3.5 |
| 35–40 | | 3.5 |
| 30–35 | | 3.3 |
| 25–30 | | 3.4 |
| 20–25 | | 3.6 |
| 15–20 | | 5.1 |
| 10–15 | | 1.8 |
| 7–10 | | 0.0 |

After the catalyst has been continuously employed in a distillate desulfurization run for a period of 16 hours, a ditillate feed containing 1.074 weight percent sulfur was passed for an eight hour period through the column containing the prepared catalyst composite at a liquid hourly space velocity of 5.0. The column was maintained at a temperature of 610° F. and a pressure of 600 psig. A hydrogen gas, (80.0 weight percent hydrogen) was passed to the column at the rate of 2000 scf per barrel of feed. The distillate feed had the following properties:

| Gravity, API | (ASTM D-287) | 34.0 |
|---|---|---|
| Flash P. M. | (ASTM D-93) - °F | 154.0 |
| Pour Point | (ASTM D-97) - °F | + 5.0 |
| Distillation | | |
| IBP | | 347 |
| % Condensed At | | 760MM |
| 5 | | 454° F |
| 10 | | 481 |
| 20 | | 521 |
| 30 | | 536 |
| 40 | | 546 |
| 50 | | 554 |
| 60 | | 561 |
| 70 | | 572 |
| 80 | | 583 |
| 90 | | 601 |
| 95 | | 613 |
| End Point | | 637 |
| Recovery Percent | | 98.8 |
| Residue Percent | | 1.1 |

74.0 weight percent of the sulfur in the feed was separated from the distillate during the eight hour run.

The catalyst preparation method described above was repeated with the exception that the alumina support was calcined at a temperature of 1000° F. in the presence of air for a period of 3 hours. The catalyst composite after impregnation of the alumina with molybdenum, nickel and cobalt metals and calcination of the composite by the procedure described above, had a pore volume of 0.512 cc/g, a surface area of 232.2 square meters/g, an average pore radius of 60.1 A units, and a pore volume distribution over the range of pores having a radius of 0 to 300 A units as follows:

| Pore Radius, A Units | | Pore Volume % |
|---|---|---|
| 250–300 | A Radius | 1.2 |
| 200–250 | | 2.3 |
| 150–200 | | 4.0 |
| 100–150 | | 28.5 |
| 90–100 | | 8.3 |
| 80–90 | | 10.0 |
| 70–80 | | 8.8 |
| 60–70 | | 8.3 |
| 50–60 | | 7.1 |
| 45–50 | | 3.0 |
| 40–45 | | 3.7 |
| 35–40 | | 2.9 |
| 30–35 | | 2.8 |
| 25–30 | | 2.8 |
| 20–25 | | 5.2 |
| 15–20 | | 1.1 |
| 10–15 | | 0.0 |
| 7–10 | | 0.0 |

The distillate desulfurization run described above was repeated, employing identical process parameters. During this second run, 81.0 weight percent of the sulfur in the distillate feed was separated therefrom. This represents a 9.5 percent improvement in the desulfurization process which can be directly attributed to the calcination of the alumina support prior to the impregnation of the hydrogenation metals at a temperature in the range of 800° to 1600° F.

EXAMPLE 2

The catalyst preparation and the desulfurization runs of Example 1 were repeated with the exception that the alumina support and catalyst composite were calcined at a temperature of 900° F. The alumina support employed in the preparation of the catalyst composite was characterized as follows:

| Surface Area, Square meters/g | | 300.7 |
|---|---|---|
| Pore Volume, g/cc | | 0.620 |
| Average Pore Radius, A units | | 41.2 |
| Pore Volume Distribution | | |
| % of Pore Vol. in Pores of | | |
| 250–300 | A radius | 1.7 |
| 200–250 | | 3.2 |
| 150–200 | | 9.6 |
| 100–150 | | 21.7 |
| 90–100 | | 5.5 |
| 80–90 | | 6.0 |
| 70–80 | | 5.9 |
| 60–70 | | 6.3 |
| 50–60 | | 6.2 |
| 45–50 | | 3.0 |
| 40–45 | | 3.8 |
| 35–40 | | 3.1 |
| 30–35 | | 3.6 |
| 25–30 | | 4.1 |
| 20–25 | | 4.3 |
| 15–20 | | 5.7 |
| 10–15 | | 5.9 |
| 7–10 | | 0.3 |

After calcination at 900° F. for a period of 3 hours, the properties of the alumina support were as follows:

| Surface Area, square meters/g | | 249.8 |
|---|---|---|
| Pore Volume, g/cc | | 0.680 |
| Average Pore Radius, A units | | 54.4 |
| Pore Volume Distribution | | |
| % of Pore Vol. in Pores of | | |
| 250–300 | A radius | 1.2 |
| 200–250 | | 3.6 |
| 150–200 | | 14.1 |
| 100–150 | | 28.2 |
| 90–100 | | 3.3 |
| 80–90 | | 10.0 |
| 70–80 | | 6.0 |
| 60–70 | | 5.7 |
| 50–60 | | 4.9 |
| 45–50 | | 2.8 |
| 40–45 | | 2.6 |
| 35–40 | | 2.5 |
| 30–35 | | 2.4 |
| 25–30 | | 2.6 |
| 20–25 | | 3.8 |
| 15–20 | | 6.0 |
| 10–15 | | 0.3 |
| 7–10 | | 0.0 |

The hydrogenation materials (molybdenum, nickel and cobalt) were impregnated on the calcined support by the method of Example 1. The catalyst composite was then dried employing the procedure of Example 1 and calcined at a temperature of 900° F. in the presence of air for a period of 3 hours. The catalyst composite product had a pore volume of 0.533 cc/g, a surface area of 202.0 square meters/g, an average pore radius of 52.7 A units and a pore volume distribution over the range of pores having a radius of 0 to 300 A units, as follows:

| Pore Radius, A Units | | Pore Volume |
|---|---|---|
| 250–300 | A Radius | 1.1 |
| 200–250 | | 4.0 |
| 150–200 | | 15.0 |
| 100–150 | | 29.0 |
| 90–100 | | 5.8 |
| 80–90 | | 5.8 |
| 70–80 | | 5.7 |
| 60–70 | | 5.7 |
| 50–60 | | 4.4 |
| 45–50 | | 2.9 |
| 40–45 | | 2.1 |
| 35–40 | | 2.7 |
| 30–35 | | 2.1 |
| 25–30 | | 3.1 |
| 20–25 | | 3.9 |
| 15–20 | | 5.0 |
| 10–15 | | 1.6 |
| 7–10 | | 0.0 |

In the distillate desulfurization run 82.0 weight percent of the sulfur was separated from the feed.

EXAMPLE 3

In this example the criticality of employing a catalyst composite having an average pore radius in the range of 40 to 80 A units and a pore volume distribution wherein the pores of at least 40 percent of the pore volume have a radius in the range of 50 to 300 A units is demonstrated. A catalyst composite was prepared containing the same concentration of molybdenum, nickel and cobalt as the catalyst composites of Examples 1 and 2. The catalyst composite had a pore volume of 0.28 cc/g, a surface area of 295.5 square meters/g, an average pore radius of 19.0 Angstrom units and a pore volume distribution as follows:

| Pore Radius, A Units | | Pore Volume % |
|---|---|---|
| 200–300 | A Radius | 1.7 |
| 100–200 | | 5.7 |
| 50–100 | | 9.0 |
| 40–50 | | 6.9 |
| 30–40 | | 11.5 |
| 20–30 | | 20.0 |
| 7–20 | | 45.2 |

This catalyst composite was employed in the hydrodesulfurization of the distillate of Example 1. When employing a freshly prepared catalyst, and the same process parameters of Example 1 with the exception of temperature, it was found to be necessary to operate at a temperature of 623° F. to obtain 80 percent desulfurization of the distillate.

Comparing this with the second distillate run of Example 1, it is readily apparent that by employing a catalyst composite having the novel average pore radius and pore volume distribution combination defined in this invention, the desulfurization reaction can be conducted at a substantially lower temperature (600° F.) than is required for the above described catalyst composite. With the capability of operating at the lower desulfurization temperature substantially longer catalyst life is the result.

EXAMPLE 4

The effect of employing a catalyst composite having an average pore radius of at least 40 A units in the desulfurization of gas oil is demonstrated. Two composite catalysts were prepared and employed in the desulfurization of the gas oil using identical process parameters with the exception of temperature. The gas oil employed in the desulfurization runs had a distillation range of 600° to 1000° F. The composite catalysts employed in the two runs had the following properties:

|  |  | Catalyst A | Catalyst B |
|---|---|---|---|
| Conc. of Nickel, Wt. % | | <0.1 | 0.1 |
| Conc. of Cobalt, Wt. % | | 2.5 | 3.0 |
| Conc. of Molybdenum, Wt. % | | 11.1 | 10.9 |
| Conc. of Alumina, Wt. % | | 85.91 | 85.65 |
| Surface Area, m²/g. | | 270 | 183 |
| Pore Volume, cc/g. | | 0.42 | 0.52 |
| Average Pore Radius, A units | | 31 | 57 |
| Compacted Density, cc/g. | | 0.68 | 0.73 |
| Pore Vol. Distr., % of P.V. in Pores of | | | |
| 200–300 | A radius | 4.3 | 7.3 |
| 100–200 | | 7.3 | 33.7 |
| 50–100 | | 15.7 | 37.1 |
| 40–50 | | 11.2 | 6.6 |
| 30–40 | | 19.9 | 6.9 |
| 20–30 | | 29.1 | 6.1 |
| 7–20 | | 12.5 | 2.3 |

When employing Catalyst A in the desulfurization of the gas oil, it was necessary to employ a desulfurization temperature of 737° F. to obtain 90 percent desulfurization of the gas oil. When employing Catalyst B in the desulfurization of the gas oil, a temperature of only 720° F. was effective in separating 90 percent of the sulfur from the gas oil feed. A comparison of these two runs demonstrates that by employing a composite catalyst having an average pore radius in the range of 40 to 80 A units a reduction in the desulfurization temperature of 17° F. is obtained.

Although the invention has been described with reference to specific embodiments, references, and details, various modifications and changes will be apparent to one skilled in the art and are contemplated to be embraced in this invention.

We claim:

1. A process for catalytically hydrode-sulfurizing a sulfur-containing asphaltene-free petroleum distillate which comprises contacting said distillate with hydrogen at hydrodesulfurization conditions and with a catalyst consisting essentially of a hydrogenating component selected from the Group VI-B metals and at least one hydrogenating component selected from the iron group metals composited with an alumina base, at least 65 percent of the pore volume of said composite catalyst being in pores having a radius in the range of 50 to 300 A units, the average pore radius of said composite catalyst being in the range of 45 to 75 A units, the surface area of said composite catalyst being at least 150 square meters per gram, the pore volume of said composite catalyst being at least 0.5 cc per gram said composite catalyst having been prepared by calcining an alumina support having a bayerite content in the range of 0 to 50 weight percent at a temperature in the range of 800° to 1600°F., impregnating said calcined alumina support with said hydrogenating components, and thereafter calcining said impregnated alumina support at a temperature in the range of 800° to 1600°F.

2. The process of claim 1 wherein said composite catalyst comprises from 0.1 to 5 weight percent of at least one material of the iron group metals, from 5.0 to 15 weight percent of molybdenum, and alumina.

3. The process of claim 1 wherein said composite catalyst comprises from 0.1 to 5 weight percent cobalt, from 0.1 to 5 weight percent nickel, from 5.0 to 15 weight percent molybdenum, and alumina.

4. The process of claim 1 wherein the hydrodesulfurization process is conducted at a temperature in the range of 550° to 800° F., at a liquid weight hourly space velocity of 0.25 to 10, at a pressure in the range of 200 to 5000 psig, and at a hydrogen rate in the range of 700 to 3000 standard cubic feet per barrel of distillate feed.

* * * * *